S. C. HILLS.
AGITATING MACHINE.
APPLICATION FILED FEB. 3, 1917.
1,302,923.
Patented May 6, 1919.
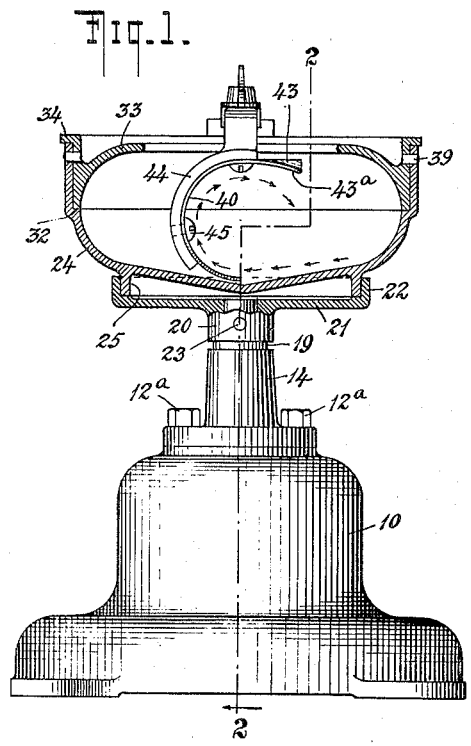
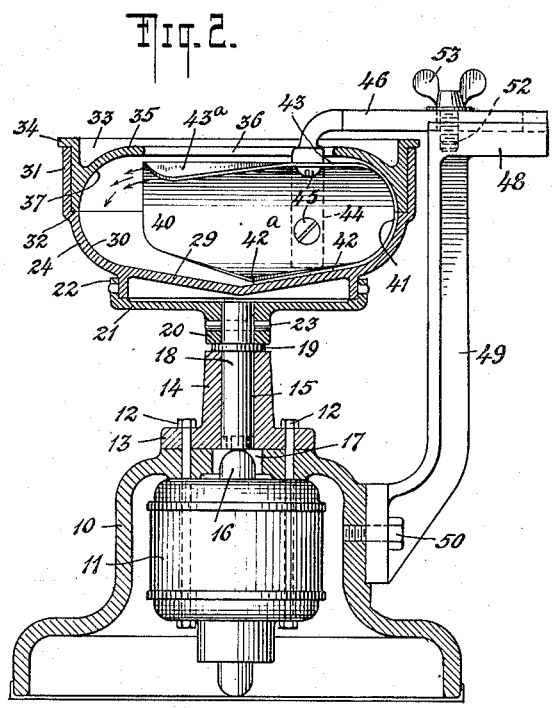
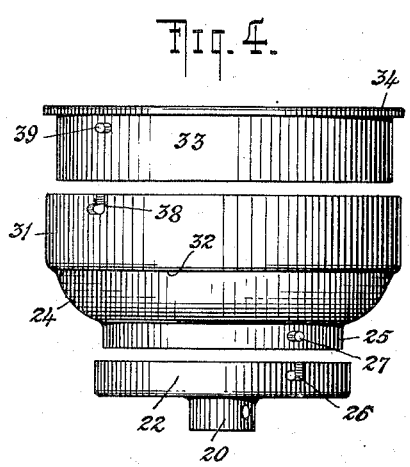
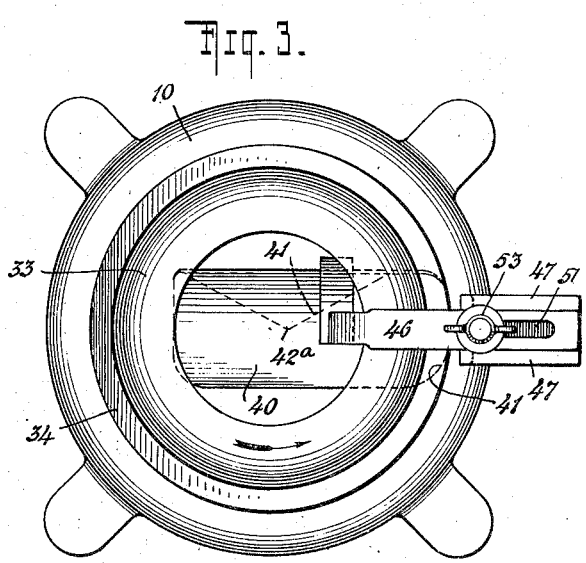
WITNESSES
INVENTOR
Sidney C. Hills
BY
ATTORNEYS

UNITED STATES PATENT OFFICE.

SIDNEY C. HILLS, OF TORRINGTON, CONNECTICUT, ASSIGNOR TO THE TURNER & SEYMOUR MANUFACTURING CO., OF TORRINGTON, CONNECTICUT, A CORPORATION OF CONNECTICUT.

AGITATING-MACHINE.

1,302,923.    Specification of Letters Patent.    Patented May 6, 1919.

Application filed February 3, 1917. Serial No. 146,338.

*To all whom it may concern:*

Be it known that I, SIDNEY C. HILLS, a citizen of the United States, and resident of Torrington, county of Litchfield, and State of Connecticut, have invented certain new and useful Improvements in Agitating-Machines, of which the following is a specification.

My invention relates to machines for beating, whipping, churning and mixing substances such as eggs, cream, butter, mayonnaise dressing and the like, and has for its object to provide a simple apparatus whereby the indicated operations may be performed in a minimum of time and with a maximum of efficiency. Other objects of my invention will appear from the description hereinafter and the features of novelty will be pointed out in the appended claims.

In the accompanying drawings which show an example of my improved machine for illustrative and descriptive purposes, Figure 1 is an elevation partly in section; Fig. 2 is a vertical section on the line 2—2 of Fig. 1; Fig. 3 is a plan view and Fig. 4 is a detail elevation of parts of the machine.

As shown in the illustrated example the machine comprises a hollow base 10 of suitable form and material which, as illustrated, may form a housing for an electric motor 11, the latter in this case providing the motive power whereby the machine is driven. It will, of course, be understood that this is not an arbitrary arrangement and that the electric motor may be otherwise operatively combined with the machine and further that, if desired, other forms of driving mechanism may be substituted for said electric motor 11. When combined with the machine as in the illustration the motor 11 may be suspended within the base 10 by means of bolts 12, the latter passing through and, if desired, being also utilized to secure the flange 13 of an upright standard 14 upon said base, said standard being provided with an axial bore 15 extending therethrough; in practice additional bolts 12ᵃ may be provided as an additional means whereby said standard 14 is fastened upon said base 10. In this manner the base 10, motor 11 and standard 14 may be combined in the form of a compact unit the individual parts of which are capable of being readily disconnected one from the other whenever necessary or desired. The driving shaft 16 of the motor 11 extends into an axial opening 17 formed in the upper portion of the base 10 in axial registry with the bore 15 of the standard 14 and is preferably detachably coupled with one end of an upright shaft 18 journaled in said axial bore 15. The upright shaft 18 extends upwardly beyond the upper end of said standard 14 and may be held against axial displacement in a downward direction relatively to said standard in any suitable manner as, for instance, by being provided at a proper point with an annular flange 19 arranged to rotatably rest upon the upper end of said standard 14 as shown in Fig. 2. The upper projecting end of the shaft 18 extends into a depending collar 20 forming part of or secured to a supporting member 21, which in the illustrated form is provided with a peripheral upright flange 22. The collar 20 and shaft 18 may be secured together in any suitable manner to cause the member 21 and shaft 18 to rotate in unison as, for instance, by means of a pin 23 which passes through said collar and shaft as shown in Fig. 2. The member 21 serves to support a receptacle or bowl 24 which, in the illustrated example, is provided with a depending flange 25 arranged to fit within the flange 22 as shown in Fig. 2, the receptacle 24 being preferably combined with the member 21 so as to be readily detachable therefrom. Any suitable means may be provided for this purpose, the illustrated example showing the peripheral flange 22 of the supporting member 21 formed with a plurality of slots 26 of the bayonet type adapted to receive pins or projections 27 extending radially outward from the depending flange 25. The pins or projections 27 are so located on the flange 25 as to properly coöperate with the slots 26 to detachably secure the receptacle or bowl upon the supporting member 21. It will be understood that the receptacle or bowl 24 may be of any suitable construction, shape, size or dimensions and that it may be constructed of any suitable material. In the preferred form the bottom 29 of the bowl 24 converges downwardly toward a central point, while its interior surface above the bottom is curved in the arc of a circle as indicated at 30. The bowl 24 above said curved surface 30, in the illustrated example, extends upwardly in the form of an integral sleeve 31, the inner surface of which is offset with respect to the curved surface 30 whereby a horizontal annular shoulder 32 is formed interiorly of said bowl as shown in Figs. 1 and 2. In its operative condition the bowl 24 in the form illustrated further comprises an upper section 33 which may be termed a cover and which when operatively combined therewith rests upon said annular shoulder 32 and has an outer surface arranged to fit within the sleeve 31, the said upper section or cover 33 being further formed with an annular, horizontal flange 34 adapted to rest upon the upper end of said sleeve 31 as shown in Figs. 1 and 2. The top 35 of said upper section 33, which may be straight or otherwise formed, is provided with an opening 36 and said section 33 is further formed with an interior surface 37 curved in the arc of a circle; the surface 37 merges into the top 35 and forms a continuation of the surface 30 of the bowl when the parts are combined. By reason of the fact that in the illustrated form of bowl the upper section 33 rests upon the shoulder 32, the surfaces 30 and 37 are continuous and unbroken, and are substantially flush with each other as shown in Figs. 1 and 2, the two surfaces 30 and 37 together forming an arc of approximately 180° as also shown in said figures. If the bowl is made in two sections as shown, frictional contact between the parts alone may be relied upon to combine the bowl 24 and upper section 33 in detachable operative relation to each other, or any other means may be utilized either in addition or as a substitute. For instance, as shown in the illustrated example, the sleeve 31 may be provided with a plurality of slots 38 of the bayonet type adapted to receive and accommodate pins or projections 39 extending radially outward from said upper section 33 at suitable points to properly coöperate with said slots to lock the parts together. If the illustrated and described devices are utilized to detachably connect the upper section 33 and bowl 24 and the latter and the supporting member 21 together, the arrangement of the slots will always be such that the tendency of the parts when the machine is in operation will be to maintain the pins or projections 27 and 39 in proper locking engagement with the respective slots. In other words in such cases the closed ends of the approximately horizontal portions of said slots will always point in directions opposite to the direction of operation of the machine which will be more fully described hereinafter. It will, of course, be understood that any other means whereby the desired results are accomplished may be substituted for the pins and slots.

My improved machine further comprises a blade or beating member 40 which throughout its major portion in the illustrated example is curved in cross-section and which has its one end 41 shaped to substantially conform to the curve of the interior surfaces 30 and 37 of the bowl 24 and upper section 33 respectively. The parts of the machine are so arranged and proportioned that, when operatively combined there exists only a slight clearance between the end 41 of the blade 40 and the surfaces 30 and 37 as shown approximately in Fig. 2. The said blade or beating member 40 is further formed with a lower edge 42 which follows the form of the bottom 29 and extends from the end 41 almost to the center of said bottom and then, in the illustrated example, inclines upwardly whereby a point 42$^a$ is provided as shown in Figs. 2 and 3. The upper portion of the blade or beating member 40 extends beyond said point 42$^a$ when viewed, for instance, in plan as in Fig. 4 and is partly substantially straight as indicated at 43 and then gradually inclines downwardly with gradually increasing transverse curve toward the free end of said blade 40 as indicated at 43$^a$ in Figs. 1 and 2. It will of course be understood that the blade 40 may be otherwise constructed and shaped than as shown, if this should be found necessary or advisable.

In the example shown in the drawings the blade 40 is carried by a support 44 to which it is preferably detachably secured, for instance, by means of screws 45, said support 44 depending from an arm 46 which, as illustrated in Fig. 2, extends in a substantially horizontal direction beyond the bowl 24. In the preferred arrangement the arm 46 forms an adjustable carrier whereby the position of the blade 40 may be properly adjusted in the bowl, and with this end in view may be slidably mounted, for instance, between guides 47 located upon a substantially horizontal member 48. The latter, as shown in the drawings, may form part of or if desired it may be secured to an upright bracket 49 which extends upwardly from and is connected with the base 10 in any suitable munner as by means of bolts 50. In order that the arm 46 and with it the blade 40 may be rigidly secured in an adjusted position, the arm 44 may be provided with a slot 51 for the accommodation of a screw threaded shank 52 which screws into the member 48 and which forms part of a wing nut or thumb screw 53. The latter in its operative position bears upon the upper surface of the arm 46 and clamps the same against movement upon the member 48, the base of the head of the screw 53 being sufficiently large to bridge and extend beyond the slot 51. It will, of course, be understood that the illustrated and described arrangement is only an example and that the blade 40 may be supported in any other desired manner so as to remain stationary relatively to the bowl when the machine is in operation as will be more fully described hereinafter.

In practice the material to be treated is introduced into the bowl 24, the upper section 33 being removable to facilitate the operation, and the motor 11 or other driving mechanism is set in motion. This causes the motor shaft 16, upright shaft 18 and supporting member 21 to be actuated, with the result that the bowl 24 and its connected parts are rotated, preferably at a high rate of speed, and always relatively to the blade 40 which remains stationary. As the bowl 24 thus revolves, the material in accordance with the well known principle of centrifugal force quickly flows to the side of the bowl and is given a rapid, whirling movement because of the rotary motion of said bowl. As this takes place in a machine constructed as in the illustrated example, that portion of the material which is located upon the bottom 29 will be scooped up, as it were by the point 42ª and edge 42 of the relatively stationary blade 40 and will follow the contour thereof in an upward curl and will finally be projected at high velocity from the free edge of the portions 43 and 43ª of said blade in approximately the manner indicated by the arrows in Fig. 1. At the same time that portion of the material which is located upon the surfaces 30 and 37 of the bowl 24 will contact with the end 41 of the relatively stationary blade 40 and will pass inwardly along the same as will be apparent from the drawings. That portion of the material last mentioned is thus added to the upwardly curling portion first mentioned and partly partakes of a similar movement so as to be projected from the free edge of the portions 43 and 43ª and partly carries some of said first mentioned portion of material with it to the free end of said blade 40 from which it is projected at high velocity back to the bowl. It will be seen that the centrifugal or whirling motion of the material is suddenly arrested and diverted in a direction diametrical to said centrifugal or whirling motion and at the same time is also diverted in a curved direction transverse to said diametrical movement; in other words the material is given two distinct motions as it contacts with the blade 40 and further, when the machine is running at high speed, that it is constantly being projected at high velocity against the blade 40 and back from said blade to the bowl. This violent agitation of the material causes it to be broken up into small particles, all of which are freely accessible, substantially in their entirety and all of which as a result freely absorb air as will be readily apparent. The rapid motion given to the material introduces the principle of the inspirator and causes air to be entrained to a maximum degree by the small particles into which the material is broken by the action of the machine. That is to say, the machine embodies mechanically the principle of the well known manual operation usually carried out with the aid of a fork and dish and which has always been considered as the most satisfactory method for the treatment of many materials, such as the beating of eggs, whipping of cream, etc. In order to enable the matter to be easily understood it may be mentioned that the important factor in beating eggs, whipping cream, mixing dressings, etc., is the projection of air into the material which is being treated, which heretofore has been most satisfactorily accomplished by means of the manual method above mentioned. By careful experiments I have determined for instance, that the whites of eggs cannot be beaten to the consistency required in cooking, if placed in a closed or tightly covered receptacle. If the fluffy appearance of the whites of eggs when properly beaten is kept in mind it will be realized that a large volume of the material consists of air, otherwise the volume thereof would not be multiplied several times beyond its original condition as it is in practice. The same is true of whipped cream and many other substances. It is believed that the same principle also applies to the churning of butter to a certain extent at least, as experiments which I have made have shown that butter may be made with a machine of the kind shown and described herein in sixty-five seconds, whereas the common method of churning requires from five to fifteen minutes to complete the operation. The action of manually beating or whipping with a fork is peculiar in that it imparts a beating and striking effect upon the material and at the same time keeps it in a whirl in the dish in a manner similar to the effect produced by centrifugal force. The impact of the fork or other beating element against the material has the effect of breaking the latter into small particles and constantly changes the surface of the material, so that all parts thereof are brought into direct contact with the air. The whirling motion imparted to the material increases the breaking up of the surface thereof while the speed of motion acquired by the material through the whirling motion serves to entrain or draw in the air to a maximum extent. This is exactly in accord with the principle of operation of my improved machine which accordingly operates with a maximum of efficiency and speed.

The machine may be efficiently used for beating eggs, whipping cream, mixing mayonnaise and other dressings, churning butter and for many other purposes and is particularly adapted for large establishments where speed of production and quantity as well as quality of product are essential.

The machine is extremely compact and simple in arrangement, is easily operated and requires no specially skilled attention. The individual parts of the machine may be readily disconnected from each other for cleaning, repairing and other purposes so that the apparatus may be maintained in a condition of maximum cleanliness and efficiency with a minimum of effort. It will of course be obvious that the bowl 24 and section 33 may form integral parts of a single unit and further that the bowl may be otherwise constructed if desired.

Various changes in the specific form shown and described may be made within the scope of the claims without departing from the spirit of my invention.

I claim:

1. A machine of the kind described comprising means for imparting a whirling motion to a material, and substantially rectilinear means, transversely recessed, whereby the whirling motion of said material is diverted lengthwise of the substantially rectilinear means and in a path transversely thereto to change the physical characteristics of said material.

2. A machine of the kind described comprising a bowl adapted to contain a material and having its bottom dished downwardly toward the center, means for rotating said bowl whereby said material is given a centrifugal motion, a transversely recessed, stationary member in said bowl against which said material is projected, said member having its one end in close proximity to and shaped to correspond to the inner upright surface of said bowl and having a lower edge in close proximity to at least a portion of said bottom and converging toward the center thereof and means located externally of said bowl for supporting said member.

3. A machine of the kind described comprising a bowl adapted to contain a material, means for rotating said bowl whereby said material is given a centrifugal motion, a stationary substantially rectilinear blade curved transversly of its length located in said bowl against which said material is projected and whereby the centrifugal motion of said material is diverted lengthwise of said blade and in a curved path transversely thereof and means for supporting said blade.

4. A machine of the kind described comprising a hollow support, a driving motor within said support, an upright shaft journaled in said support in operative connection with said motor and projecting upwardly beyond said support, a carrying member connected with the projecting end of said shaft, a bowl detachably connected with said carrying member, an upper cover section detachably connected with said bowl and having an opening, a stationary blade curved transversely of its length located in said bowl and having an edge and its one end conforming to and in close proximity to the inner surface of said bowl, a stationary bracket carried by said support, an arm carrying said blade and extending exteriorly through the opening of said upper section into slidable engagement with said bracket and means whereby said arm is secured against movement relatively to said bracket.

5. A machine of the kind described comprising a bowl adapted to contain a material, a transversely recessed member in said bowl extending rectilineally and diametrically beyond the center thereof in opposite directions and means for rotating said bowl relatively to said member whereby a circular motion of said material is arrested thereby and converted into a tumbling motion.

In testimony whereof I have hereunto set my hand.

SIDNEY C. HILLS.